United States Patent [19]

Hayashi

[11] Patent Number: 5,313,282
[45] Date of Patent: May 17, 1994

[54] DEVICE FOR CONTROLLING POWER SUPPLIED TO A SATELLITE BROADCAST RECEIVER IN A TELEVISION

[75] Inventor: Toshihide Hayashi, Kanagawa, Japan
[73] Assignee: Sony Corporation, Tokyo, Japan
[21] Appl. No.: 939,829
[22] Filed: Sep. 3, 1992

[30] Foreign Application Priority Data

Sep. 10, 1991 [JP]  Japan ................................ 3-230363

[51] Int. Cl.$^5$ .................................................. H04N 5/63
[52] U.S. Cl. .................................... 348/729; 348/730; 348/734; 455/3.2; 455/140
[58] Field of Search ................ 358/188, 191.1, 190, 358/194.1; 455/3.2, 6.2, 132, 140, 188.1; H04N 5/44, 5/63

[56] References Cited

U.S. PATENT DOCUMENTS

| 4,862,290 | 8/1989 | Jung et al. ............................ 358/190 |
| 4,903,130 | 2/1990 | Kitagawa et al. .................... 358/190 |

FOREIGN PATENT DOCUMENTS

| 0420550 | 4/1991 | European Pat. Off. ........ H04N 5/63 |
| 0477891 | 4/1992 | European Pat. Off. ........ H04N 5/63 |
| 0477891A | 4/1992 | European Pat. Off. ........ H04N 5/63 |
| 0493653A1 | 7/1992 | European Pat. Off. ........ H04N 5/44 |
| 4134983A | 5/1992 | Japan ............................. H04N 5/63 |
| 2257879A | 1/1993 | United Kingdom ........... H04N 5/63 |

OTHER PUBLICATIONS

JP63285088 Patent Abstracts of Japan–vol. 13 No. 114, Nov. 22, 1988 Aikawa Hiroyuki, Television Receiver Incorporating Satellite Broadcast Transmitter-Receiver, Eurpoean Patent Office.
JP2203449 Patent Abstracts of Japan–vol. 14, No. 498, Aug. 13, 1990, Kasugaya Kazuhisa, Satellite Broadcast Receiving/Video Recording Device, European Patent Office.

Primary Examiner—Mark R. Powell
Assistant Examiner—Jeffrey S. Murrell
Attorney, Agent, or Firm—Jerry A. Miller; Pasquale Musacchio

[57] ABSTRACT

A method and apparatus for controlling electrical power to a satellite broadcast receiver forming a part of a television device. The television device receives a command receiving a command (e.g. from a remote controller) to turn off electrical power. The television device determines if broadcast satellite recording is currently being executed, for example by an external VTR connected to an output port of the television device. If broadcast satellite recording is being executed, power is turned off power to a portion of the television device while retaining electrical power to the satellite broadcast receiver. If broadcast satellite recording is not being executed, power is turned off to the broadcast satellite receiver also.

8 Claims, 3 Drawing Sheets

DEVICE FOR CONTROLLING POWER SUPPLIED TO A SATELLITE BROADCAST RECEIVER IN A TELEVISION

BACKGROUND

1. Field of the Invention

This invention relates to a television. More particularly, the invention relates to a television receiver capable of receiving, for example, not only conventional UHF and VHF television broadcasts but also satellite broadcasts.

2. Background of the Invention

Recently, a television receiver has been proposed which can receive not only the general UHF and VHF television broadcasts but also satellite broadcasts. This television receiver has a satellite broadcast receiving section which is separate from the conventional broadcast television tuner.

The main power supply of this television receiver can be turned on or off by, for example, a remote controller after the mechanical switch is turned on (called the stand-by state or the like). When the main power supply is turned on, power is supplied to the general television broadcast tuner and to the satellite broadcast receiving section. These tuner and receiving section receive broadcast signals and provide output to the remainder of the television. When the main power supply is turned off, power is interrupted to the conventional television tuner and the satellite broadcast receiving section, and thus these tuner and satellite receiving section cease operations.

When a conventional television broadcast is recorded by a video tape recorder (VTR), the tuner of the VTR can receive the television broadcast. Thus the broadcast can be recorded by the VTR, even though the main power of the television receiver is in the off-state.

If this VTR has no satellite broadcast receiving section, when the VTR is connected to the television receiver, the main power supply of the television receiver is turned on, and the satellite broadcast received by the satellite broadcast receiving section of the television receiver is recorded by the VTR. However, if the main power supply of the television receiver is turned off, no power is supplied to the satellite broadcast receiving section. That is, if the main power supply of the television receiver is switched off by mistake during the time in which a satellite broadcast is being recorded on the VTR, the received video and audio signals are not supplied from the satellite broadcast receiving section and thus they are not recorded on the VTR.

In view of this aspect, this invention provides a television receiver which, even though the main power is turned off, can still continuously receive the satellite broadcast and supply the video and audio signals to an outside apparatus such as a VTR during the time in which the satellite broadcast is being recorded on the outside apparatus.

SUMMARY OF THE INVENTION

It is an object of the present invention to maintain a satellite broadcast to be received and the video and audio signals to be supplied to the outside, or to continuously record the satellite broadcast on the outside apparatus during the recording of the satellite broadcast even though the main power is turned off.

It is a feature that the present invention to provides a television receiver capable of receiving satellite broadcasts in which the satellite broadcast receiving section of the television can be continuously powered during the recording of a satellite broadcast even after the main power switch is turned off.

These and other objects, advantages and features of the invention will become apparent to those skilled in the art upon consideration of the following description of the invention.

According to this invention, the television receiver is capable of receiving satellite broadcasts. The satellite broadcast receiving section is continuously powered during the recording of a satellite broadcast even after the main power supply is turned off. The reception of a satellite broadcast and the supply of the video and audio signals to the outside can be maintained, or the satellite broadcast can be continuously recorded on an outside apparatus during the recording of the satellite broadcast even after the main power supply is turned off.

The present invention contemplates a television receiver capable of receiving satellite broadcasts, wherein during the recording of a satellite broadcast a satellite broadcast receiving section is continuously powered even after a main power supply is turned off.

A television device according to one embodiment includes a television receiver for receiving conventional television broadcasts. A satellite broadcast receiver receives a television signal from a satellite and converts the television signal to a converted television signal. A switching circuit selectively supplies the converted television signal to the output terminal. A power supply independently supplies electrical power to the television receiver and the satellite broadcast receiver. A controller controls the power supply so that the electrical power is supplied to the satellite broadcast receiver when the converted television signal is supplied to the output terminal, even if electrical power is not being supplied to the television receiver.

A method, according to the invention, of controlling electrical power to a satellite broadcast receiver forming a part of a television device, includes the steps of: receiving a command to turn off electrical power; determining if broadcast satellite recording is being executed; if broadcast satellite recording is being executed, turning off power to a portion of the television device while retaining electrical power to the satellite broadcast receiver; if the broadcast satellite recording is not being executed, turning off power to the broadcast satellite receiver.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

According to this invention, there is provided, as for example, shown in FIGS. 1 to 4, a television receiver capable of receiving satellite broadcasts, wherein a satellite broadcast receiving section 22 is continuously powered during the recording of a satellite broadcast even after a main power supply is turned off.

Figure 1:
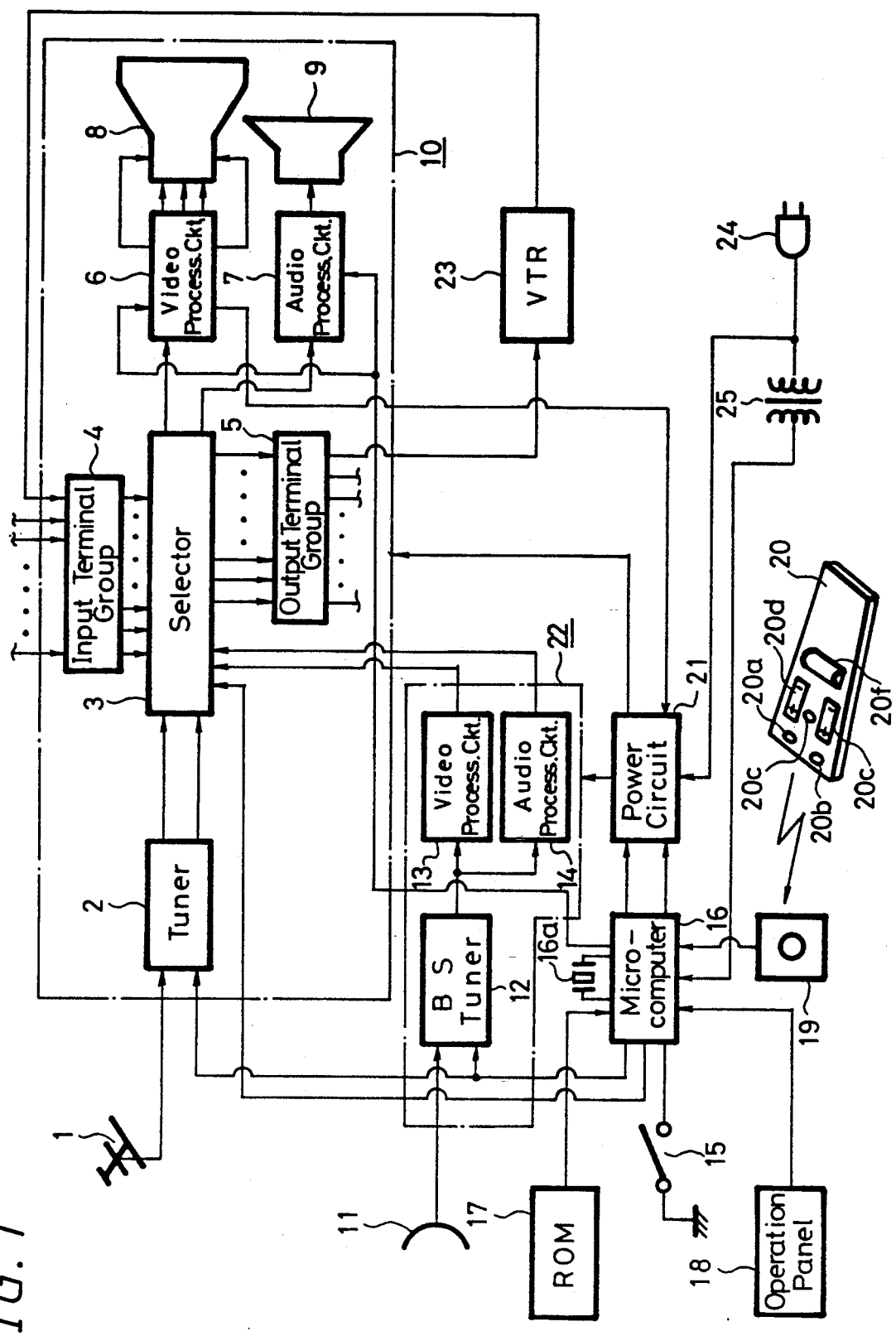
FIG. 1 is a block diagram of one embodiment of the television receiver of the invention.

One embodiment of the television receiver of the invention will be described in detail with reference to FIG. 1. In FIG. 1, there is shown an antenna 1. This antenna 1 receives the television high-frequency signals in the VHF band or UHF band. The television high-frequency signals are supplied to a tuner 2. This tuner 2 selects a broadcast from the television high-frequency signals received by the antenna 1 in accordance with a control signal from a microcomputer 16.

The microcomputer 16 has a video RAM, ROM and RAM and supplies to the tuner 2 a control signal based on a channel information signal which is supplied to the microcomputer from an operation panel 18 or through a photosensor 19 from a remote controller 20. Also, the microcomputer 16 performs various operations on the basis of an oscillation signal from an oscillator 16a, and permits a ROM 17 to store various parameters which are set by the user as will be described later.

This tuner 2 converts the video signal of the selected television high-frequency signal into an intermediate frequency signal of 58.75 MHz and the audio signal thereof into an intermediate frequency of 54.25 MHz. These video intermediate frequency signal and the audio intermediate frequency signals are amplified, detected, and processed for the automatic gain control and other various signal processing operations. Then, the video and audio outputs from the tuner are supplied to a selector 3.

This selector 3 selects any one of the video and audio signals from an input terminal group 4, the video and audio signals from the tuner 2, and the video and audio signals from a satellite broadcast receiving section 22 which will be described later, in accordance with the control signal from the microcomputer 16. Selector 3 supplies the selected video and audio signals to a video processing circuit 6 and an audio processing circuit 7, respectively.

The input terminal group 4 and an output terminal group 5 are connected as illustrated. That is, the video and audio input terminals of, for example, a VTR 23 as the outside apparatus are connected to certain video and audio output terminals of the output terminal group 5, and the video and audio output terminals of this VTR 23 are connected to certain video and audio input terminals of the input terminal group 4.

The video processing circuit 6 separates a carrier chrominance signal from the composite video signal fed from the selector 3, and reproduces color difference signals from this carrier chrominance signal. Then, the color difference signals and the luminance signal are combined to produce primary color signals of R, G and B necessary to drive a color picture tube. These primary color signals are supplied to the color picture tube.

This video processing circuit 6 derives signals for driving the vertical and horizontal deflection coils from the composite video signal fed from the selector 3, and supplies these signals to the vertical and horizontal coils not shown, respectively. Moreover, this video processing circuit 6 is controlled by the microcomputer 16 so that it supplies the primary color signals R, G and B for use in providing an information display (e.g., channel, volume and so on) from the microcomputer 16 to the color picture tube 8 or supplies them together with the primary color signals R, G and B for video image to the color picture tube 8.

On the other hand, the audio processing circuit 7 amplifies the audio signal from the selector 3, performs other processing on it, and supplies the processed audio signal to a loudspeaker 9.

The satellite broadcast receiving section 22 will be described. There is shown a parabolic antenna (which may be a BS plane antenna) 11. This antenna receives an FM television signal of, for example, 12 GHz frequency band from a selected satellite and converts this received FM television signal by use of its converter into a first intermediate frequency of 1 GHz. The 1-GHz first intermediate frequency signal into which the received signal is converted by this antenna 11 is supplied to a BS tuner 12.

This BS tuner 12 selects a signal band from the first intermediate frequency signal of GHz band fed from the antenna 11 in accordance with a control signal (determined by the channel selection operation on the operation panel 18 or remote controller 20) from the microcomputer 16, or produces a second intermediate frequency signal which then undergoes FM demodulation. The output from the BS tuner is supplied to a video processing circuit 13 and to an audio processing circuit 14.

The video processing circuit 13 processes the FM modulated signal from the BS tuner 12 so as to produce a video signal, and supplies this video signal to the selector 3. The audio processing circuit 14 filters out the band of the FM demodulated television signal, demodulates the band-passed television signal into a 4-phase DPSK (Differential Phase Shift Keying) and is subjected to various processing on it so as to produce an audio signal. This audio signal is supplied to the selector 3.

The above-mentioned television main section 10 and the satellite broadcast receiving section 22 are driven by the power from a power supply circuit 21. This power supply circuit 21 is connected through a plug 24 to the commercial source of power so as to produce various supply voltages, which are supplied to respective portions in accordance with control signals from the microcomputer 16. The power circuit 21 is normally in the so-called stand-by state in which the fundamental mechanical switch (not shown) is in the on-state. The power circuit 21 is supplied with control signals by the microcomputer 16 (which is powered through a transformer 25) when a switch (main power switch) 15 is on, so that it supplies source voltages to the respective portions of the television receiver.

In practice, the switches (not shown) on the operation panel 18 or the remote controller 20 are operated when a video signal from a television broadcast or a satellite broadcast or a video signal from other various outside apparatus (such as VTR 23 in this embodiment) is displayed on the screen or when a video signal and audio signal of a television broadcast or satellite broadcast are recorded on the VTR or the like.

Of the buttons of this remote controller 20, 20a indicates a power button. Each time this power button 20a is pushed, the infrared ray signal, for example, from the controller 20 is supplied through the photosensor 19 to the microcomputer 16. The microcomputer 16 controls the power supply circuit 21 to start or stop supplying power to each portion, thus turning the television receiver on or off.

Hereinafter, similarly it is assumed that the infrared ray signal is supplied from the remote controller 20 through the photosensor 19 to the microcomputer 16, and that the microcomputer 16 supplied with the signal executes control commands according to this infrared ray signal.

20b indicates an input switching button. Each time this input switching button 20b is pushed, the received video and audio signals from the tuner 2, those from the BS tuner 12 and those from the outside apparatus (VTR 23 or the like) connected to the input terminal group 4 are selected in turn by the selector 3 under the control of the microcomputer 16. The selected video signal is supplied to the video processing circuit, and the selected audio signal is supplied to the audio processing circuit.

Thus, each time the input switching button 20b is pushed, the image displayed on the screen and the audio produced at the speaker switch sequentially from the three sources (broadcast television, satellite television and outside source such as VTR).

20c indicates a channel switching button. Each time the positive (+) side thereof as illustrated is pushed, a signal indicative of a higher channel number is supplied to the microcomputer 16. Each time the negative (−) side thereof as illustrated is pushed, a signal indicative of a smaller channel number is supplied to the microcomputer. The channel increases or decreases as long as the user holds down the button. In this manner, the tuner 2 or BS tuner 12 makes a channel selection, so that a desired video image specified by this channel switching button 20c is displayed on the screen of the color picture tube 8 and that a desired audio sound can be produced by the speaker 9.

20d indicates a volume control button. Each time the positive (+) side as illustrated is pushed, the volume control data supplied from the microcomputer 16 to the audio processing circuit 7 directs an increase in volume and thus the sound emanated from the speaker 9 increases. Each time the negative (−) side is pushed, the sound control data supplied from the microcomputer 16 to the audio processing circuit 7 indicates a decrease in volume, and hence the sound emanated from the speaker 9 decreases. The volume, thus, continues to increase or decrease as long as the button is pushed.

20e indicates a menu button. When this menu button 20e is pushed, the microcomputer 16 reads menu data stored in an internal video RAM (not shown). This menu data is supplied as primary color signals R, G and B to the color picture tube 8 through the video processing circuit 6, and is displayed on the screen as a menu image. The data stored on the video RAM is read from an internal ROM (not shown).

Figure 3:
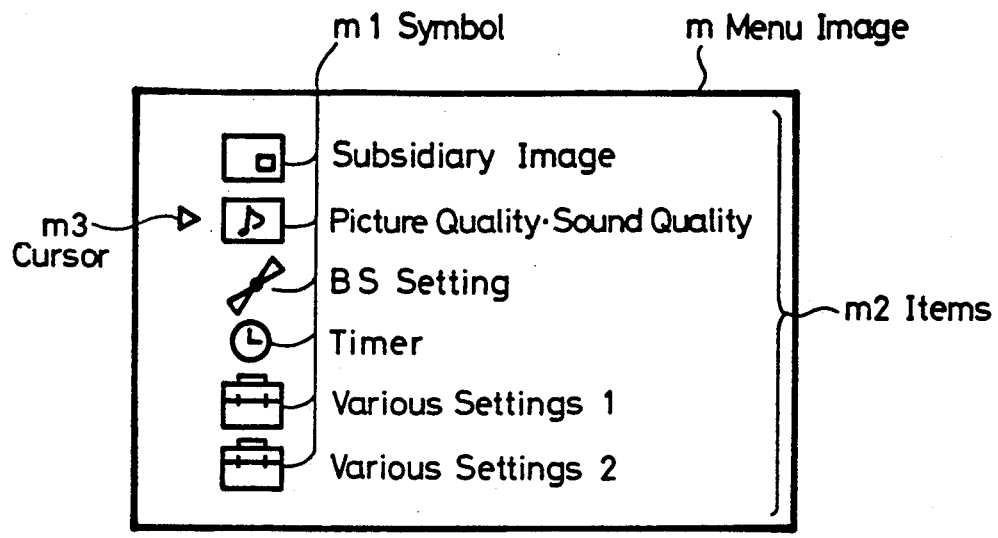
FIG. 3 is a diagram useful for explaining the one embodiment of the television receiver of the invention.

FIG. 3 shows an example of this menu image. That is, when the menu button 20e of the remote controller 20 is pushed, the menu image m shown in FIG. 3 is displayed on the screen of the color picture tube 8.

In FIG. 3, m3 indicates a cursor, and elements m1 are symbols (i.e., icons) which provide for easy visual understanding of items m2. 20f indicates a selection/determination roller. It is used when the above menu image m is displayed on the screen of the color picture tube 8. When this roller 20f is rotated in one or the other direction, the cursor m3 moves to the left side of the symbol m1 corresponding to a desired one of the items m2 of the menu, thus pointing to the desired one of the items m2. Then, when this roller 20f is pushed while pointing to a desired one of items m2, the item m2 which is pointed to is selected.

When the desired one of the items m2 of the menu image m is pointed to and selected, an image n of the n th hierarchy is displayed on the screen of the color picture tube 8.

Figure 4:
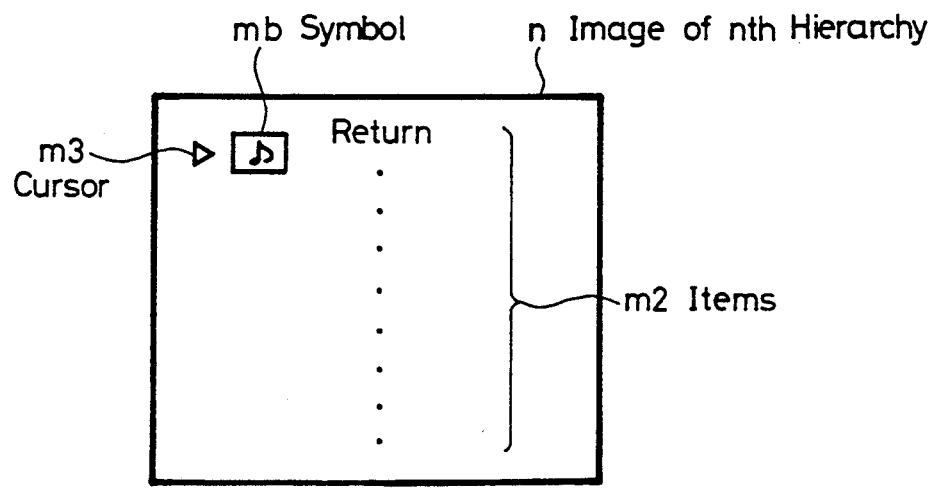
FIG. 4 is a diagram useful for explaining the one embodiment of the television receiver of the invention.

In FIG. 4, mb indicates the visual symbol or icon of the item m2 which is used for returning to one level before this hierarchy image. Element m3 is the cursor. For example, the symbol m1 of the selected one of the items m2 in FIG. 3 (in this case, "picture quality and sound quality") is returned to by selecting the symbol mb.

The other ones of items m2 are further lower hierarch items and parameters. These n th hierarchy images n have the item 2 of "return" as shown in FIG. 4.

For example, as described above, the roller 20f is rotated to move the cursor m3 to the left side of the symbol m1 corresponding to other desired one (parameters) of items m2 not shown, thus pointing to the desired item m2. Then, the roller 20f is pushed to select item m2. At this time, the n th hierarchy image n is displayed as shown in FIG. 4. After setting and so on, the cursor m3 is moved to the left side of the symbol mb of the item m2 of "return" by rotating the roller 20f, thus selecting this "return" item 2. Then, when the roller 20f is pushed, the menu image m shown in FIG. 3 is displayed on the screen of the color picture tube 8. As a result of the operation, the changed parameters at respective items are stored in the ROM (for example, an EEPROM) 17. When the menu image m is stopped from being displayed on the color picture tube 8, the menu button 20e is pushed. Thus, the microcomputer 16 stops the signal output of the menu data so as not to display the menu image m on the color picture tube 8.

In this television receiver, while the video signal and audio signal from the BS tuner 12 are being recorded on the outside apparatus such as VTR 23, even though the main power switch 15 is turned off, only the satellite broadcast receiving section 22 is powered from the power circuit 21 under the control of the microcomputer 16.

Figure 2:
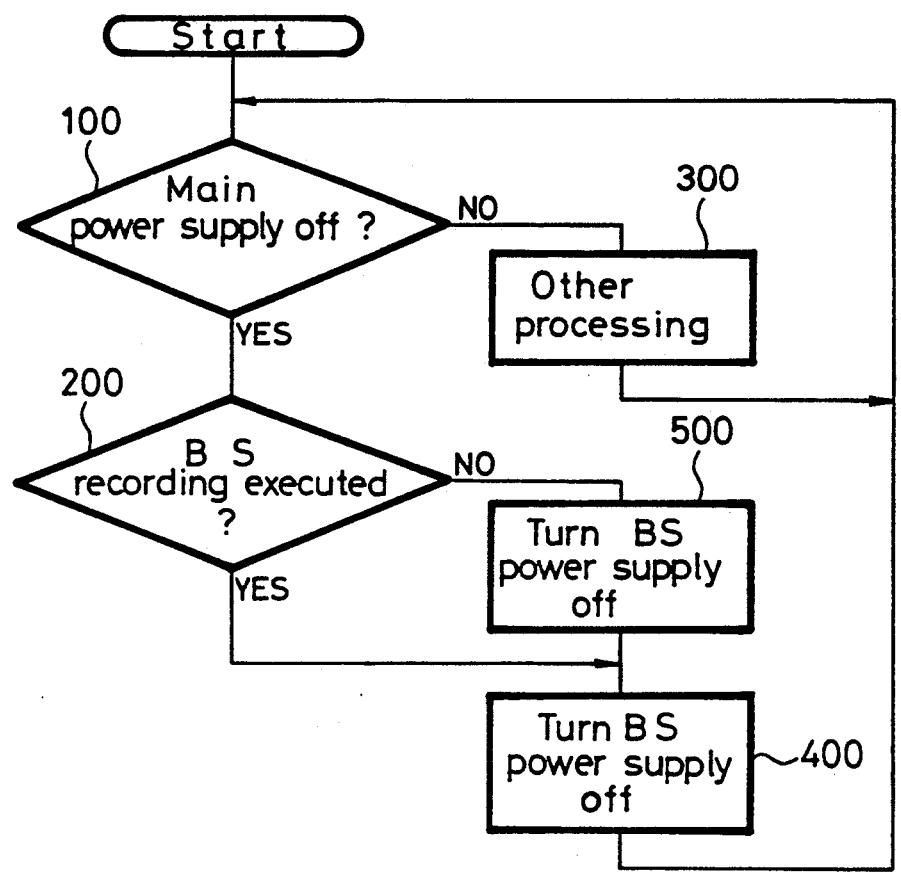
FIG. 2 is a flow chart useful for explaining the one embodiment of the television receiver of the invention.

This will be described with reference to the flow chart of FIG. 2. First at step 100, the process determines if the main power supply, or main power switch 15 is off. If the decision is "YES" (power supply is off), the process goes to step 200. If the decision is "NO", the process goes to step 300.

At step 200, the process determines whether BS recording is being executed or not, or of which the video and audio signals from the BS tuner 12 are being supplied to the outside apparatus such as VTR 23. If the decision is "YES", the process proceeds to step 400. If the decision is "NO", the process goes to step 500.

At step 400, the power supply for the system is turned off. In other words, the power circuit 21 is controlled to stop the power from being supplied to the television main section 10, but not to the BS receiver 22 and microcomputer 16 and associated hardware. Then, the program again goes back to step 100.

At step 500, the BS power supply is turned off. In other words, the power circuit 21 is controlled to stop the power from being supplied to the satellite broadcast receiving section 22. Then, the program goes back to step 400.

In this example, even though the main power supply is in the off-state, a decision is made of whether BS recording is being executed, or whether the satellite broadcast receiving section 22 supplies the received signal to the outside, and then determination is made of the supply of power to the satellite broadcast receiving section 22. Thus, even though the main power supply is turned off (that is, the power supply to the main television section 10), the satellite broadcast receiving section 22 can continue to receive and the video and audio signals can be supplied to the outside during the satellite broadcast recording, or the satellite broadcast can be continuously recorded on the outside apparatus.

According to this invention, since the television receiver capable of receiving satellite broadcasts is able to maintain power to be supplied to the satellite broadcast receiving section 22 during recording a satellite broadcast even after the main power supply is turned off, or the satellite broadcast can be maintained to be received and the video and audio signals can be supplied to the outside during the satellite broadcast recording, or the satellite broadcast can be continuously recorded on the outside apparatus.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A television device, comprising:
   a satellite broadcast receiver for receiving a satellite broadcast and for recording said satellite broadcast;
   a television receiver for receiving a television broadcast; and
   power supply means for independently supplying power to said satellite broadcast receiver and said television receiver wherein during the recording of said satellite broadcast said satellite broadcast receiver is continuously powered by said power supply means when said television receiver is not supplied with said power.

2. A television device, comprising in combination:
   a television receiver for receiving conventional television broadcasts;
   a satellite broadcast receiver for receiving a televisions signal from a satellite and converting said television signal to a converted television signal;
   an output terminal;
   switching means for selectively supplying said converted television signal to said output terminal;
   power supply means for independently supplying electrical power to said television receiver and said satellite broadcast receiver; and
   control means for controlling said power supply means so that said electrical power is supplied to said satellite broadcast receiver when said converted television signal is supplied to said output terminal, and said electrical power si not supplied to said television receiver.

3. The television device of claim 2, further comprising a video tape recorder connected to said output terminal and receiving said converted television signal.

4. The television device of claim 2, wherein said control means includes a microcomputer.

5. The television device of claim 4, further comprising: a remote controller having an infrared transmitter for transmitting command signals to said television device; an infrared receiver, coupled to said microcomputer, for receiving said command signals from said remote controller and providing said command signals to said microcomputer.

6. A television device, comprising in combination:
   a television receiver for receiving conventional television broadcasts;
   a satellite broadcast receiver for receiving a television signal from a satellite and converting said television signal to a converted television signal;
   an output terminal;
   switching means for selectively supplying said converted television signal to said output terminal;
   power supply means for independently supplying electrical power to said television receiver and said satellite broadcast receiver;
   control means including a microprocessor for controlling said power supply means so that said electrical power is supplied to said satellite broadcast receiver when said converted television signal is supplied to said output terminal, and said electrical power is not supplied to said television device;
   a video tape recorder connected to said output terminal and receiving said converted television signal;
   a remote controller having an infrared transmitter for transmitting command signals to said television device; and
   an infrared receiver, coupled to said microcomputer, for receiving said command signals from said remote controller and providing said command signals to said microcomputer.

7. A method of controlling electrical power to a satellite broadcast receiver forming a part of a television device, comprising the steps of:
   receiving a command to turn off electrical power;
   determining if broadcast satellite recording is being executed;
   if broadcast satellite recording is being executed, turning off power to a portion of said television device while retaining electrical power to said satellite broadcast receiver;
   if said broadcast satellite recording is not being executed, turning off power to said broadcast satellite receiver.

8. The method of claim 7, wherein said command is received from a remote controller.

* * * * *